United States Patent
Suzzarini et al.

(10) Patent No.: US 11,273,663 B2
(45) Date of Patent: Mar. 15, 2022

(54) METHOD FOR MAKING A SECURITY DOCUMENT COMPRISING A THERMOPLASTIC SUBSTRATE AND UV-CURED IMAGE AND SECURITY DOCUMENT FORMED THEREBY

(71) Applicant: Canadian Bank Note Company, Limited, Ottawa (CA)

(72) Inventors: Laurence Suzzarini, Ottawa (CA); David Cruikshank, Carleton Place (CA); Thivaharan Thurailingam, Stittsville (CA)

(73) Assignee: CANADIAN BANK NOTE COMPANY, LIMITED

( * ) Notice: Subject to any disclaimer, the term of this patent is extended or adjusted under 35 U.S.C. 154(b) by 0 days.

(21) Appl. No.: 15/734,196

(22) PCT Filed: Apr. 24, 2019

(86) PCT No.: PCT/CA2019/050515
§ 371 (c)(1),
(2) Date: Dec. 1, 2020

(87) PCT Pub. No.: WO2019/232614
PCT Pub. Date: Dec. 12, 2019

(65) Prior Publication Data
US 2021/0162795 A1 Jun. 3, 2021

(30) Foreign Application Priority Data
Jun. 5, 2018 (CA) .................................. CA 3007268

(51) Int. Cl.
*B42D 25/387* (2014.01)
*B42D 25/405* (2014.01)
(Continued)

(52) U.S. Cl.
CPC ......... *B42D 25/387* (2014.10); *B42D 25/405* (2014.10); *B42D 25/45* (2014.10); *C09D 11/101* (2013.01)

(58) Field of Classification Search
CPC .... B42D 25/387; B42D 25/45; B42D 25/405; C09D 11/101
(Continued)

(56) References Cited

U.S. PATENT DOCUMENTS

| 2010/0045024 A1* | 2/2010 | Attner ................. B42D 25/328 283/72 |
| 2014/0145426 A1* | 5/2014 | Lettow .................. B42D 25/45 283/85 |

* cited by examiner

*Primary Examiner* — Justin V Lewis
(74) *Attorney, Agent, or Firm* — Olson & Cepuritis, Ltd.

(57) ABSTRACT

A method is provided by the invention for making a security document comprising a thermoplastic substrate with a UV light cured printed image that is less likely to result in splitting of the ink of the UV light cured printed image during the lamination step of forming the thermoplastic substrate. The UV light cured image is applied to an interior thermoplastic layer surface of a stack of thermoplastic layers configured to form a thermoplastic substrate upon lamination of the stack and comprises numerous small sub-portions having small gaps between them sufficient to permit relative movement of individual sub-portions during lamination, the thermoplastic layer(s) from the ultraviolet light cured image to an exterior surface of the stack being sufficiently see-through that the image is visible upon viewing the security document. Alternatively, or additionally, the image is applied to an interior surface of an outermost thermoplastic layer of the stack adjacent an intermediate thermoplastic layer of the stack wherein the outermost thermoplastic layer has a higher melting point than the melting point of at least the adjacent intermediate thermoplastic layer.

20 Claims, 2 Drawing Sheets

(51) Int. Cl.
 *B42D 25/45* (2014.01)
 *C09D 11/101* (2014.01)
 *B42D 25/351* (2014.01)
(58) Field of Classification Search
 USPC .............. 283/67, 70, 72, 85, 89, 94, 98, 901
 See application file for complete search history.

METHOD FOR MAKING A SECURITY DOCUMENT COMPRISING A THERMOPLASTIC SUBSTRATE AND UV-CURED IMAGE AND SECURITY DOCUMENT FORMED THEREBY

CROSS-REFERENCE TO RELATED APPLICATIONS

This application is a U.S. National Stage of PCT/CA2019/050515, filed Apr. 24, 2019, which claims priority of Canadian Patent Application No. 3,007,268, filed Jun. 5, 2018, each of which is incorporated herein by reference.

FIELD OF THE INVENTION

The invention relates generally to making security documents having thermoplastic substrates such as identification cards and data pages, and, more particularly, to such security documents having ultraviolet (UV) light curable images printed or applied to their thermoplastic substrates.

BACKGROUND

Security documents such as identification cards and data pages may include one or more images or elements formed by printing or applying a UV light curable ink for security purposes. For example, a security document in the form of an identification card, a driver's license or personal identification sheet of a passport may be made of a thermoplastic substrate and may bear an image comprising a secure design feature that is printed onto the thermoplastic substrate using a UV light curable ink, where the ink film thickness of the cured ink is in the range of 5 to 12 microns thick. It is also known in the field of security document printing that screen printing produces a significantly thicker layer of ink than does, for example, lithography, type and offset printing and a thicker layer of ink in thermoplastic layers is more likely to result in ink splitting upon lamination of thermoplastic layers to form the security document.

To prevent or reduce security violations by tampering with such printed images they may be embedded within the thermoplastic substrate rather than apply them to a surface that is readily accessible to a tamperer. The thermoplastic substrate forming a security document is made from a stack of multiple layers of polymer, polycarbonate or other thermoplastic material which are laminated together to form a unitary substrate for a security document. To embed a UV light cured image within the security document the image is printed onto a surface of a stack layer using a UV light curable ink and the ink is cured prior to lamination of the multiple layers of the stack. To permit visibility of the image upon viewing the security document the thermoplastic layers located from the image to an outermost thermoplastic layer are clear or transparent (i.e. sufficiently see-through that the image is visible upon viewing the security document). Typically the thermoplastic substrate comprises a white inner core layer sandwiched between multiple clear or transparent layers and the image in applied to a surface of one such clear or transparent layer. However, the process of laminating (i.e. bonding together) the thermoplastic layers causes the layers to soften and reform under high temperature and pressure and because the UV light cured printed matter is relatively inelastic the lamination process may be damaging to the UV light cured image when a relatively thick layer of ink is applied by screen printing, and cause undesirable ink splitting (i.e. cracks) to form in the image.

Therefore, it is desirable to provide means for reducing the ink splitting of such embedded UV light cured images.

SUMMARY OF THE INVENTION

A method is provided to embed an image comprising thick ultraviolet light cured ink in a thermoplastic substrate of a security document. A stack of multiple thermoplastic layers is provided. The ultraviolet light cured image is applied to an interior thermoplastic layer surface of the stack, the image comprising numerous small sub-portions having small gaps between them sufficient to permit relative movement of individual sub-portions during lamination of the stack of multiple thermoplastic layers. Alternatively, or additionally, the image is applied to an interior surface of an outermost thermoplastic layer of a stack of thermoplastic layers adjacent an intermediate thermoplastic layer of the stack wherein the outermost thermoplastic layer preferably has a higher glass transition temperature than the glass transition temperature (Tg) of at least the adjacent intermediate thermoplastic layer, but not limited to. The thermoplastic layer(s) from the ultraviolet light cured image to an outermost thermoplastic layer of the stack are sufficiently see-through that the image is visible upon viewing the security document. The stack of multiple thermoplastic layers is laminated to form the thermoplastic substrate. The surface of the thermoplastic layer to which the image is applied is preferably the smoother of the surfaces of that thermoplastic layer having a surface roughness value of Ra≤5 microns.

The image may be sandwiched between two thin intermediary elastomeric polymeric layers, for example, layers of polyurethane, polyethylene or PVC film or the intermediary elastomeric polymeric layers may screen printed aqueous polyurethane dispersion ink.

The image is preferably applied by screen printing. The image may be formed by screen printed optically variable, magnetic ink.

A security document comprising a thermoplastic substrate having an embedded image comprising ultraviolet light cured ink is further provided.

BRIEF DESCRIPTION OF THE DRAWINGS

The invention is described in detail below with reference to the following drawings drawn to facilitate illustration of features described herein and not to scale.

DETAILED DESCRIPTION

The invention provides means for making a security document comprising a thermoplastic substrate with a thick UV light cured printed image that is less likely to result in splitting of the ink of the UV light cured printed image during the lamination step of forming the thermoplastic substrate.

Figure 1:
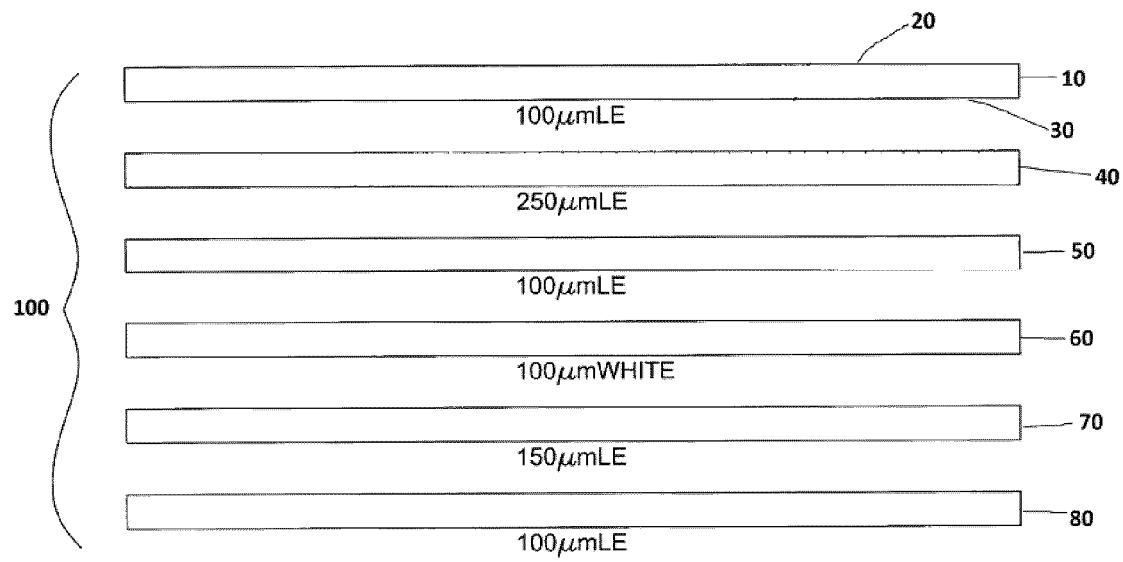
FIG. 1 is an exploded view of an exemplary thermoplastic security document substrate comprising multiple substrate layers that are combined (bonded together), by lamination of the layers, to form the security document substrate.

FIG. 1 illustrates the construction of an exemplary thermoplastic security document substrate having multiple substrate layers 10, 40, 50, 60, 70 and 80 which are bonded by lamination to form a security document substrate. The substrate layers 10, 40, 50, 60, 70 and 80 are made of polymer, polycarbonate or other thermoplastic material. The specification to be chosen for a thermoplastic substrate will depend upon the particular application and those used for identification cards and data pages are known to persons skilled in the area of manufacturing security documents. The ultraviolet light cured printed image may be applied to for visibility from the front or back of the security document.

A thick layer of UV light curable ink is printed or otherwise applied to an interior thermoplastic layer surface intermediate the outermost layers 10, 80 of the stack of thermoplastic layers 100. This may be done by any means including intaglio, screen printing, flexography, ink jet etc. For the illustrated embodiment of FIG. 2 the UV light curable ink is applied by printing it to the underside 30 of an uppermost polymer layer 10 using screen printing. The uppermost polymer layer 10 is made of clear or transparent polymer so the printed image is visible to a viewer of the security document. In the illustrated embodiment of FIG. 1 layers 10, 40, 50, 70, 80 are also clear or transparent and layer 60 is white. During the lamination of the stack of layers 100 the elastomeric polymer may distort, with the outermost layer 10, 80 doing so to a much smaller extent than the intermediate layers 40, 50, 60 and 70 because the small irregularities of the metal plates hold in place the outermost layers 10, 80 which are directly in contact with the metal plates. The lesser distortion of the uppermost layer 10 puts less stress on the UV light cured image and a reduction of ink splitting results.

For the preferred embodiment, the outermost polymer layer 10 preferably has a higher softening temperature i.e. glass transition temperature (Tg value) than the intermediate polymer layers 40, 50, 60 and 70 of the thermoplastic substrate so that during the lamination the uppermost layer 10 does not flow as much as the intermediate layers 40, 50, 60 and 70.

During lamination the substrate layers 10, 40, 50, 60, 70 and 80 are stacked 100 and placed between metal plates and the required high pressure and high temperature for lamination of the layers is applied. The UV light cured screen printed feature should be printed on the smoother surface of the uppermost layer 10 to ensure a good print quality (sharp edges, legible micro text, small details) and avoid distortion of the image between the printing and the curing of the print. For the illustrated embodiment of FIG. 1, the uppermost layer 10 is positioned in the stack 100 of layers so its smoother surface, having a surface roughness value of Ra≤5 microns, is placed over the intermediate layer 40 that is adjacent to it in the stack 100.

Figure 2:
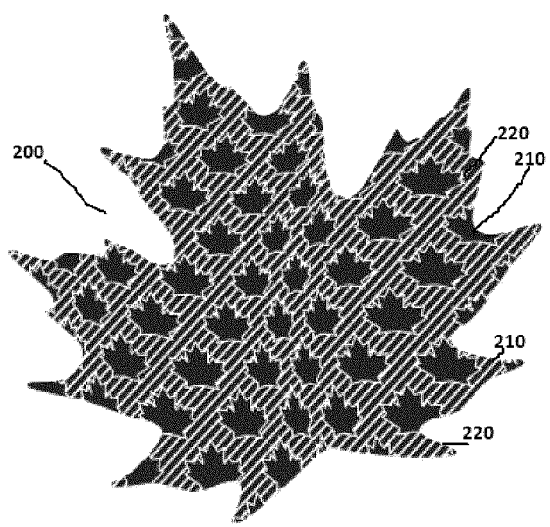
FIG. 2 is an enlarged plan view of an exemplary UV light cured printed image embedded within a thermoplastic substrate of a security document made in accordance with the invention (the security document not shown due to the enlargement).

FIG. 2 depicts, in enlarged form for purposes of illustration only, a further embodiment of a UV light cured printed image 200 embedded within a thermoplastic substrate (due to the enlargement the security document is not depicted). As can be seen from this enlarged view, the printing of the UV light cured image 200 is performed by printing small sub-portions 210 of the image 200 and providing small gaps (spaces) 220 between the printed sub-portions 210 sufficient to allow movement of the individual sub-portions 210 that is so slight it would not visible to the naked eye. The printed sub-portions of the printed image comprise ultraviolet light cured ink and are alternately referred to herein as ink sub-portions. A wide range of sizes for the gaps is possible and the particular size used is not critical so long as they are not too small to permit such slight movement and not so large that they render the applied or printed security feature ineffective to be seen by a person viewing of the security document. For a suitable embodiment gaps of about 0.1 mm, may be successfully used. The size of the sub portions varies depends on the location of the feature on the document. During lamination the flow of the polymer varies depends on other features found in the document such as transparent window, hinge, embossment, etc. These features may increase or decrease the flow of the material. Higher flow area most likely need a smaller sub portions on the device than lower flow area of the document.

Figure 3:
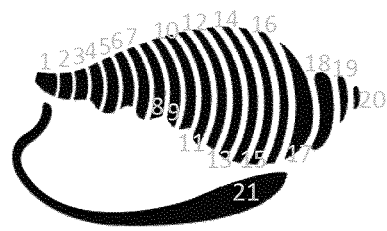
FIG. 3 is an enlarged view of a test sample of a screen printed exemplary ultraviolet light cured image comprising multiple sub-portions separate by gaps as described herein which resulted in noticeable ink splitting in a number of sub-portions but no ink splitting in others, enlarged so the sub-portions and gaps are readily visible.
Figure 4:
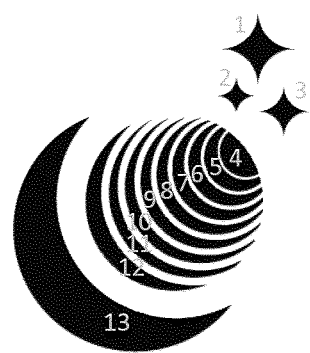
FIG. 4 is an enlarged view of another test sample of a screen printed exemplary ultraviolet light cured image comprising multiple sub-portions separate by gaps as described herein which resulted in noticeable ink splitting in a number of sub-portions but no ink splitting in others, enlarged so the sub-portions and gaps are readily visible.

FIG. 3 depicts a test sample of an ultraviolet light cured image 300, enlarged for illustrative purposes, which was screen printed as described above and comprises 21 sub-portions labelled as sub-portions 1 to 21 separated by gaps. Similarly, FIG. 4 depicts another test sample of an ultraviolet light cured image 400, enlarged for illustrative purposes, which was screen printed as described above and comprises 13 sub-portions labelled as sub-portions 1 to 13 separated by gaps. Each of these test samples resulted in noticeable ink splitting in some ink sub-portions and it was found that resulting ink splitting depends on a number of factors relating to the relative shapes and sizes of the ink sub-portions.

The following Tables 1 and 2 identify the sizes (square millimeters) of the ink sub-portions of the images of FIGS. 3 and 4, respectively, and identify by annotation those ink sub-portions which resulted in noticeable ink splitting.

TABLE 1 re FIG. 3

| Ink Sub-portion | Area (square millimeters) |
|---|---|
| 1 | 1.56 |
| 2 | 1.28 |
| 3 | 1.43 |
| 4 | 1.93 |
| 5 | 2.48 |
| 6 | 2.41 |
| 7 | 2.93 |
| 8 | 3.10 |
| 9 | 3.43 |
| 10 | 3.78 |
| 11 | 4.27 |
| 12 | 4.42 |
| 13 | 4.70 |
| 14 | 4.94 |
| 15 | 4.75 |
| 16 | 4.39 |
| 17* | 6.20 |
| 18* | 4.15 |
| 19 | 1.28 |
| 20 | 0.50 |
| 21* | 22.42 |

*Sub-portion having noticeable ink splitting

TABLE 2 re FIG. 4

| Ink Sub-portion | Area (square millimeters) |
|---|---|
| 1 | 5.87 |
| 2 | 1.64 |
| 3 | 2.93 |
| 4 | 5.06 |
| 5 | 5.67 |
| 6 | 7.03 |
| 7 | 8.22 |
| 8 | 8.87 |
| 9 | 9.38 |
| 10 | 9.54 |
| 11* | 9.56 |
| 12* | 14.05 |
| 13* | 63.93 |

*Sub-portion having noticeable ink splitting

FIG. 3 depicts an exemplary screen printed image of a sea shell comprising ultraviolet light cured ink embedded in a security document, the printed image being made up of multiple sub-portions marked as sub-portions 1 through 21, and Table 1 provides the areas of those sub-portions. It was found that ink sub-portions 17, 18 and 21 thereof, having relatively larger area and/or relatively sharp inward angles relative to the other sub-portions 1-16, and 19-20 of the printed image shown in FIG. 3, resulted in noticeable ink splitting in the security document in which they were embedded. With reference to FIG. 4 depicting a different ultraviolet light cured ink screen printed image (moon and stars) embedded in a security document test sample, and Table 2 providing the areas of the sub-portions thereof, it was found that ink sub-portions 11, 12 and 13, having relatively larger area relative to the other sub-portions 1-10 of the printed image shown in FIG. 4, resulted in noticeable ink splitting. Overall, testing of variable parameters relating to the printed image it was found that the amount of resulting ink splitting is dependent upon the size of area of the sub-portion. Generally, it was found that sub-portion areas of less than about 50 square millimeters produced significantly improved results with reduced ink splitting and/or of acceptable levels or degrees of ink splitting under commercial manufacturing conditions in the manufacturing of security documents. Further, it was found that the amount of resulting ink splitting is also dependent upon the shape of the sub-portions, in particular the relative dimensions of linear or rectangular shapes, whether the shape is closed or open and the presence of relatively sharp inward angles. If the shape of a sub-portion is generally linear or rectangular the ratio between length to width should preferably not be more than about 8. If a sub-portion includes an angular part having a concave angle the concave angle should preferably be greater than 80 degrees.

For another embodiment, the UV light cured printed layer is sandwiched between two thin intermediary elastomeric (soft) polymeric layers by applying to the front and back surfaces of the UV light cured printed layer a polymeric film such as a polyurethane, polyethylene or PVC film, or other similar film, or by coating the front and back surfaces with an ink such as Aquapress ME (or AquaPress CA) manufactured by Próell KG to form soft surface layers over them. This type of ink is a screen printable aqueous polyurethane dispersion having a thermal transition temperature which is much lower than polycarbonate. In this embodiment the UV light cured image will "float" between the sandwiching layers which become soft at the lamination temperature.

For another embodiment an ultraviolet light curable optically variable, magnetic ink, OVMI® provided by SICPA HOLDING SA of Switzerland, is used to print an image of which the sub-portions are relatively large because large solid surfaces as required for maximum visual effect by the pigments of such an ink. This type of ink contains optically variable pigments produced with the help of vacuum technology. The pigment consists of thin layers, where the middle layer is magnetic. OVMI® has special rheological properties for effective and constant pigment orientation by the printing press which is equipped with a special magnetic device create the image design, and then the OVMI® is fast dried by UV light. Printed OVMI® ink is required to be relatively non-elastic (non-thermoforming) because deformation during the lamination process will destroy the alignment of pigments and effect they produce. During lamination, when the temperature is higher than the Tg value, the layers will stretch due to high pressure. Such stretching on the OVMI® printed layer, and resulting splitting of the ink, is reduced by printing the OVMI® on film having a high Tg value and/or by printing the OVMI® to the bottom of a top clear layer because the roughness of the lamination plate grips the top layer to prevent it from stretching.

The details of the illustrated embodiments may be varied as considered expedient to a person skilled in the art and are not to be considered essential to the invention by reason only of inclusion in the embodiments illustrated herein. Rather, the invention is defined by the appended claims.

What is claimed is:

1. A method of forming an image comprising ultraviolet light cured ink embedded in a thermoplastic substrate of a security document, the method comprising:
    (a) providing a stack of multiple thermoplastic layers;
    (b) applying an ultraviolet light cured image to an interior thermoplastic layer surface of the stack, thereby forming a non-thermoforming ink layer on the interior thermoplastic layer surface of the stack, wherein the ultraviolet light cured image comprises a plurality of sub-portions having gaps between them sufficient to permit relative movement of individual sub-portions during lamination of the stack of multiple thermoplastic layers, and a portion of the stack of multiple thermoplastic layers between the ultraviolet light cured image and an exterior surface of the stack is sufficiently see-through that the image is visible upon viewing the security document; and,
    (c) laminating the stack of multiple thermoplastic layers to form the thermoplastic substrates;
    wherein integrity of the non-thermoforming ink layer is preserved during the laminating step.

2. The method of claim 1 wherein the thermoplastic layer to which the ultraviolet light cured image is applied has a higher Tg value than an adjacent thermoplastic layer of the stack.

3. The method of claim 1 wherein the sub-portions of the ultraviolet light cured image have a size of less than 50 square millimeters.

4. The method of claim 1 wherein linear or rectangular sub-portions of the image have a length to width ratio of not more than 8.

5. The method of claim 1 wherein sub-portions of the image have a concave angle greater than 80 degrees.

6. The method of claim 1 wherein the image is sandwiched between two intermediary elastomeric polymeric layers.

7. The method of claim 6 wherein the intermediary elastomeric polymeric layers comprise polyurethane, polyethylene or PVC film.

8. The method of claim 6 wherein the intermediary elastomeric polymeric layers comprise screen printed aqueous polyurethane dispersion ink.

9. The method of claim 1 wherein the image is formed by screen printed optically variable, magnetic ink.

10. The method of claim 1 wherein the image is applied by screen printing.

11. A security document comprising a thermoplastic substrate having an embedded image comprising ultraviolet light cured ink and formed by the method of claim 1.

12. A method of forming an image comprising ultraviolet light cured ink embedded in a thermoplastic substrate of a security document, the method comprising:
   (a) providing a stack of thermoplastic layers configured to form the thermoplastic substrate upon lamination of the stack of thermoplastic layers;
   (b) applying the image to an interior surface of an outermost thermoplastic layer of the stack adjacent an intermediate thermoplastic layer of the stack, thereby forming a non-thermoforming ink layer on the interior surface of the outermost thermoplastic layer of the stack, wherein the outermost thermoplastic layer is sufficiently see-through that the image is visible upon viewing the security document; and,
   (c) laminating the stack of multiple thermoplastic layers to form the thermoplastic substrate;
   wherein integrity of the non-thermoforming ink layer is maintained during the laminating step.

13. The method of claim 12 wherein the outermost layer of the stack has a higher Tg value than an adjacent intermediate thermoplastic layer of the stack.

14. The method of claim 12 wherein the image comprises a plurality of sub-portions having gaps between them sufficient to permit relative movement of individual sub-portions.

15. The method of claim 12 wherein the surface of the outermost thermoplastic layer to which the image is applied has a surface roughness value of $Ra \leq 5$ microns.

16. The method of claim 12 wherein the image is sandwiched between two intermediary elastomeric polymeric layers.

17. The method of claim 16 wherein the intermediary elastomeric polymeric layers comprise polyurethane, polyethylene or PVC film.

18. The method of claim 16 wherein the intermediary elastomeric polymeric layers comprise screen printed aqueous polyurethane dispersion ink.

19. The method of claim 12 wherein the image is formed by screen printed optically variable, magnetic ink.

20. The method of claim 12 wherein the image is applied by screen printing.

* * * * *